United States Patent
Hellums

(10) Patent No.: US 6,962,369 B2
(45) Date of Patent: Nov. 8, 2005

(54) SPARE WHEEL ASSEMBLY

(76) Inventor: James R. Hellums, 12780 FM 86, Dale, TX (US) 78616-2630

( * ) Notice: Subject to any disclaimer, the term of this patent is extended or adjusted under 35 U.S.C. 154(b) by 216 days.

(21) Appl. No.: 10/624,472

(22) Filed: Jul. 23, 2003

(65) Prior Publication Data

US 2005/0017475 A1    Jan. 27, 2005

(51) Int. Cl.$^7$ ............................. B60S 9/22; B60G 11/10
(52) U.S. Cl. ............................. 280/767; 280/124.175; 301/130
(58) Field of Search ........................... 280/767, 124.17, 280/124.175; 301/38.1, 130; 267/52

(56) References Cited

U.S. PATENT DOCUMENTS

| | | | |
|---|---|---|---|
| 1,108,690 A | 8/1914 | Brewster | |
| 1,372,813 A * | 3/1921 | Helseth | 301/130 |
| 3,190,674 A * | 6/1965 | Carter | 280/767 |
| 3,746,365 A * | 7/1973 | Kirschbaum | 280/767 |
| 3,879,058 A | 4/1975 | Horn | |
| 4,007,949 A * | 2/1977 | Norcia et al. | 280/767 |
| 4,083,574 A * | 4/1978 | Massey | 280/767 |
| 5,269,593 A | 12/1993 | Wasson | |
| 5,785,218 A | 7/1998 | LaLone et al. | |
| 5,813,687 A | 9/1998 | Lay et al. | |
| 6,164,679 A | 12/2000 | Lay | |

* cited by examiner

Primary Examiner—Peter C. English
(74) Attorney, Agent, or Firm—Stephen R. Greiner

(57) ABSTRACT

A spare wheel assembly including a frame having opposed ends. A wheel hub is secured to one end of the frame. A pair of mounting brackets, configured for attachment to the leaf springs of a trailer, is pivotally secured to the frame. One of the mounting brackets is secured to the end of the frame not bearing the wheel hub and the other one of the mounting brackets is secured to the frame between the wheel hub and the other one of the mounting brackets. A wheel is secured to the wheel hub.

8 Claims, 2 Drawing Sheets

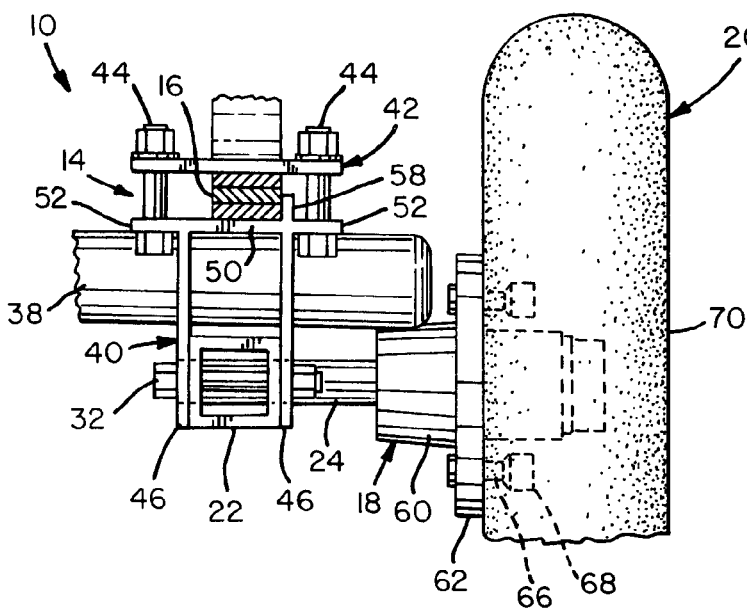
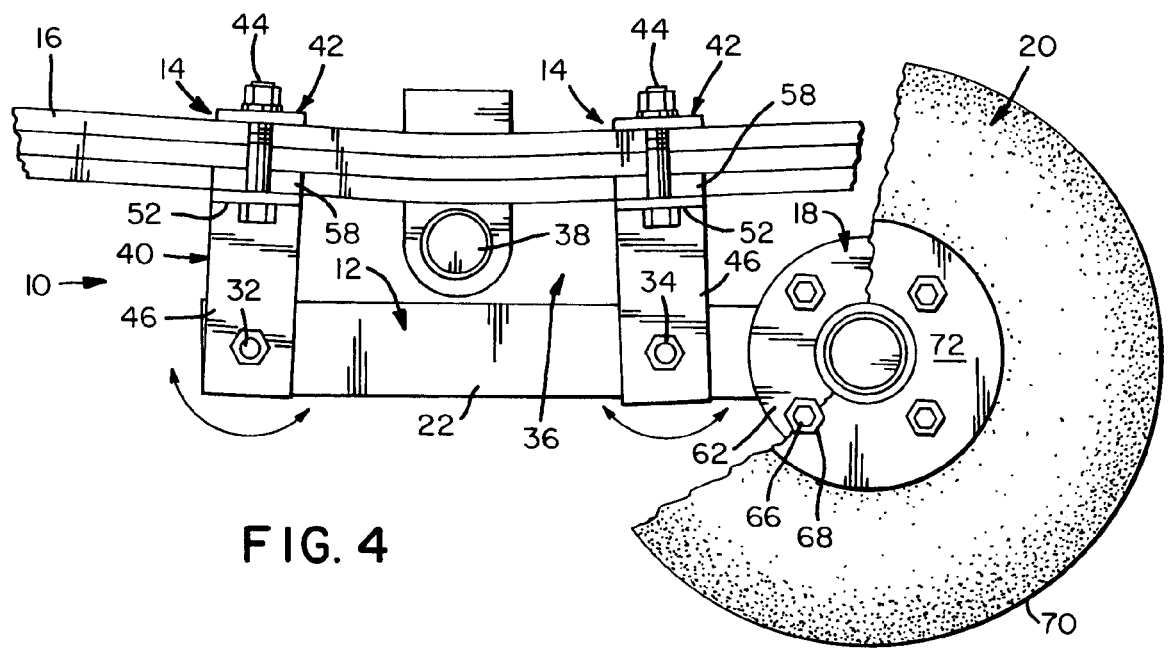

SPARE WHEEL ASSEMBLY

FIELD OF THE INVENTION

The present invention relates generally to land vehicles and, more specifically, to temporarily attached wheel assemblies for trailers of the boat-carrying type.

BACKGROUND OF THE INVENTION

Most trailers are equipped with a spare tire to help get the trailer back on the road in the event of a flat. Unfortunately, such are of little use when a wheel bearing burns out—an all too common occurrence with trailers employed in hauling pleasure boats from place to place. A burned-out bearing, of course, prevents a wheel, regardless of the condition of its tire, from turning easily.

Trailer wheels are subject to far more abuse than those of typical automobiles. For example, trailer wheels are regularly idled for long periods of time allowing bearing lubricants to deteriorate. Subsequently, they are towed at high speeds, over rough roads, and with heavy loads. Then, in the case of boat trailers, they are submerged in water resulting in: the corrosion of bearing surfaces, the washing away of lubricants, and the introduction of abrasives into wheel bearings. Subsequent towing of the trailer often causes bearing failure wherein a trailer and its more valuable cargo are left unattended on the side of the road while the user seeks help in the form of a welder to replace the failed bearing.

Some have proposed emergency wheel assemblies for temporarily replacing the wheel of a trailer that cannot be turned due to the failure of its bearing or other mishap. These assemblies may be successful in getting a trailer down the road, but since they are connected directly to the frame of a trailer, they present a boat or other thing carried by the trailer with a jarring ride. Under extreme conditions, a boat hull or other thing being carried by the trailer can be severely damaged during a rough ride. A need, therefore, exists for a spare wheel assembly that can be connected to the suspension of the trailer for presenting a smoother ride to a trailer's cargo.

SUMMARY OF THE INVENTION

In light of the problems associated with the known wheel assemblies for use with trailers having flat tires or bearing failures that prevent trailer movement, it is a principal object of the invention to provide a spare wheel assembly that offers a smooth ride to the burden of a trailer. Thus, the likelihood of damage to the costly hull of a boat or other object carried by a trailer is minimized.

It is another object of the invention to provide a spare wheel assembly of the type described that can be quickly and easily attached to the leaf springs forming part of the suspension of a trailer. The spare wheel assembly can be attached to either side of a trailer, and neither special tools nor prolonged training is required to attach and use the spare wheel assembly. In short, the spare wheel assembly is intuitive to use.

It is a further object of the invention to provide a spare wheel assembly that is compact in size and is easily transported within, or upon, a trailer or its towing vehicle. A trailer suffering a wheel problem need never be left unattended, and subject to vandalism and theft, while attempting a roadside repair.

It is an additional object of the invention to provide a spare wheel assembly of the type described that can be used with trailers produced by different manufacturers and having different load-bearing capacities.

It is an object of the invention to provide improved elements and arrangements thereof in a spare wheel assembly for the purposes described which is lightweight, rugged, inexpensive to make, and fully dependable in use.

Briefly, the spare wheel assembly in accordance with this invention achieves the intended objects by featuring a wheel hub that is secured to a frame. A pair of mounting brackets is pivotally secured to the frame and adapted for attachment to the leaf springs of a trailer. Each of the mounting brackets has a base portion with a pair of upright legs joined at their tops by a crosspiece and a locking portion positioned in registry with the crosspiece. A pair of threaded fasteners passes through the crosspiece and the locking portion for releasably and adjustably fastening the base portion and the locking portion together. A wheel is secured to the wheel hub.

The forgoing and other objects, features, and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 3 is a front view of the spare wheel assembly shown mounted on a trailer with portions broken away.

FIG. 4 is a side view of the spare wheel assembly mounted on a trailer with portions broken away.

Similar reference characters denote corresponding features consistently throughout the accompanying drawings.

DETAILED DESCRIPTION OF THE PREFERRED EMBODIMENT

Figure 1:
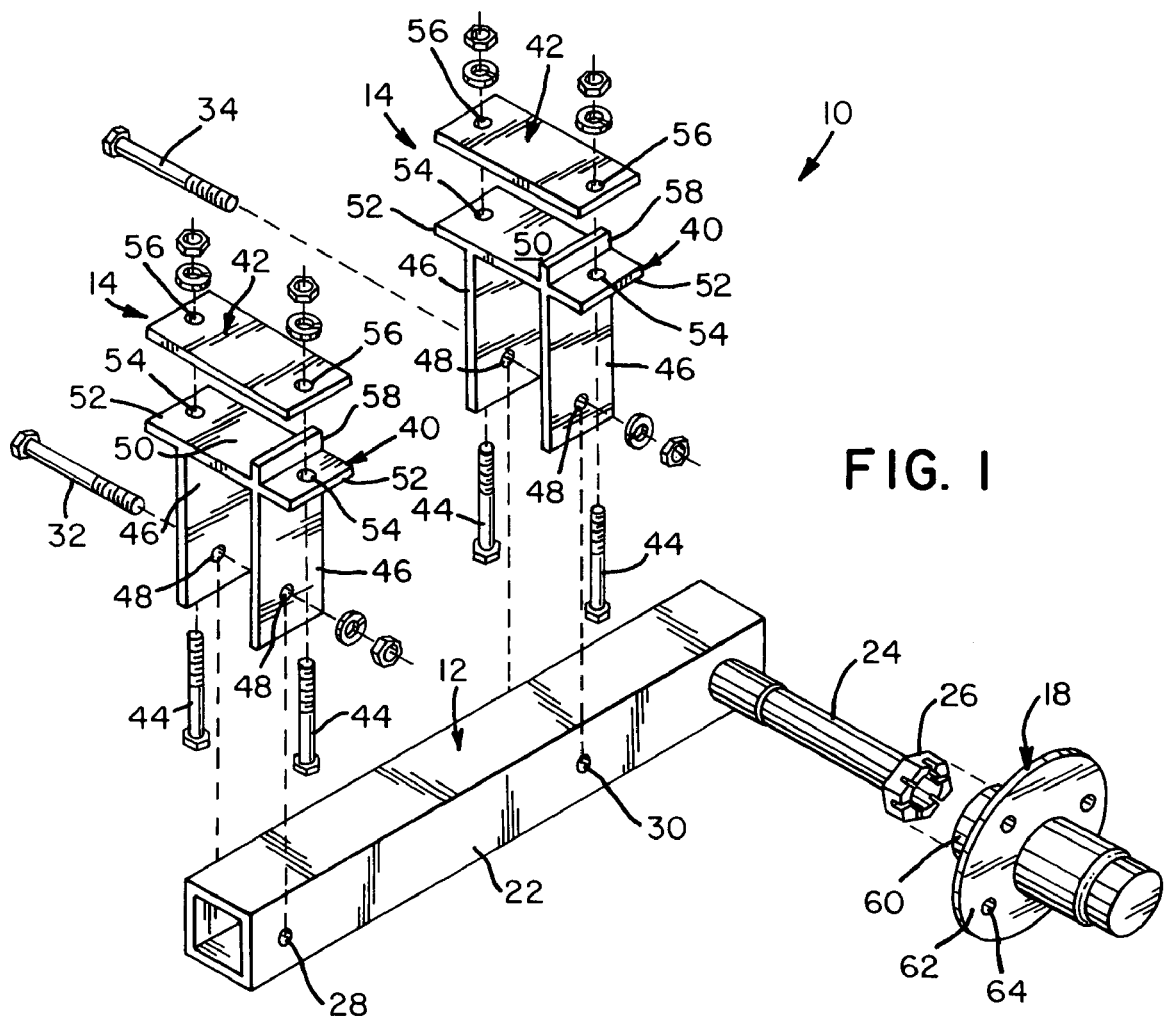
FIG. 1 is an exploded perspective view of a spare wheel assembly in accordance with the present invention.
Figure 2:
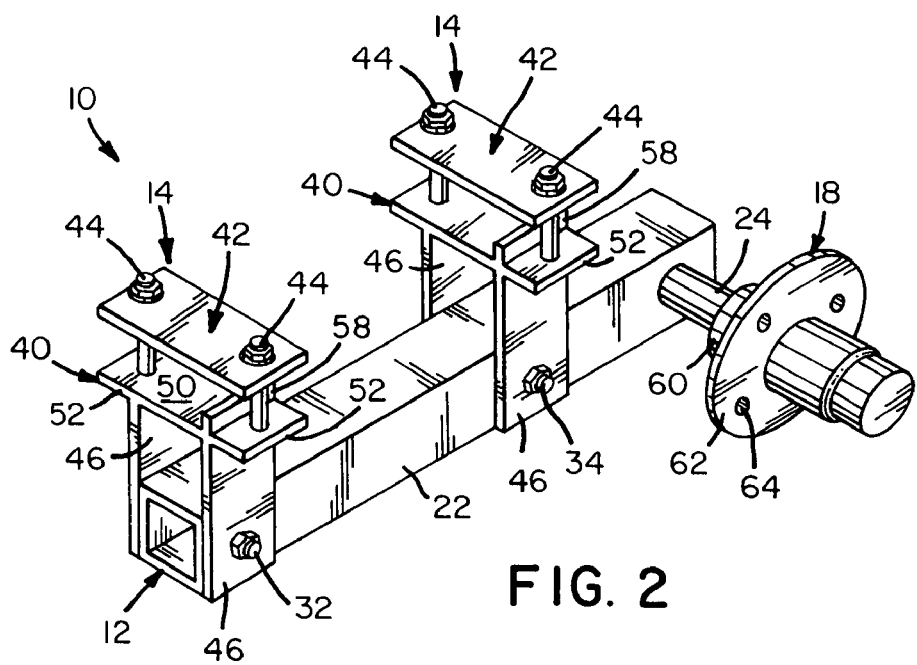
FIG. 2 is a perspective view of the spare wheel assembly of FIG. 1.

Referring now to the FIGS., a spare wheel assembly in accordance with the present invention is shown at 10. Assembly 10 includes a frame 12 having mounting brackets 14 pivotally secured to its opposite ends for attachment to the leaf springs 16 forming part of the suspension system of a trailer. A wheel hub 18 is also secured to one end of frame 12 and a wheel 20 is mounted on hub 18 for supporting frame 12 and one side of a trailer above the ground.

Frame 12 includes a longitudinal member 22 from one end of which a transverse member 24 extends at right angles. Together, longitudinal member 22 and transverse member 24 form an L-shaped unit. A fitting 26 is carried at the distal end of transverse member 24 for retaining hub 18 at a fixed distance from longitudinal member 22 so that wheel 20 is free to turn.

Spaced-apart apertures 28 and 30 in longitudinal member 22 receive threaded fasteners 32 and 34 that pivotally secure brackets 14 to frame 12. Aperture 28 is provided at the end of longitudinal member 22 opposite transverse member 24 and aperture 30 is located between aperture 28 and transverse member 24. This configuration offers a gap 36 between brackets 14 that accommodates trailer axle 38 on leaf springs 16 and serves to establish a fulcrum around fastener 34 that dampens road shocks during use.

Each bracket 14 includes a base portion 40 and a locking portion 42 that are joined together by a pair of threaded fasteners 32,34. Base portion 40 has a pair of upright legs 46, with apertures 48 in their bottoms for receiving threaded fasteners 44, that are joined at their tops by a crosspiece 50 to form a part resembling an inverted "U". Preferably, crosspiece 50 overlaps both legs 46 so as to project from their outer faces and define retaining flanges 52 on opposite sides of base portion 40 that are each provided with an aperture 54 for receiving a threaded fastener 44. Locking portion 42, however, is a flat plate having apertures 56 located at its opposite ends in registry with apertures 54 and for receiving threaded fasteners 44.

Each mounting bracket 14 is provided with a feature that ensures the proper alignment of assembly 10 on a trailer. To this end, crosspiece 50 is provided with an upstanding tab 58 at one of its ends and between apertures 54. As is best illustrated with reference to FIG. 3, tab 58 is placed in abutment with a side of leaf springs 16 to maintain wheel 20 in a rotational plane that is parallel to the longitudinal axis of leaf springs 16. Of course, the longitudinal axis of leaf springs 16 is usually parallel to the longitudinal axis of the supported trailer.

Wheel hub 18 has a bearing 60 adapted for secure mounting on fitting 26 and a wheel mounting plate 62 to one side of bearing 60 for rotational movement. Apertures 64 in plate 62 carry bolts 66 to which nuts 68 can be threadably fastened to join wheel 20 to hub 18.

Wheel 20 is conventional in its construction and has a resilient tire 70 a fixed around a stiff rim 72. The free ends of bolts 66 pass through holes (not shown) in rim 72 to receive nuts 68. The outer diameter of tire 70 is substantially the same as the outer diameter of the tire originally carried by axle 38.

Use of spare wheel assembly 10 is straightforward. First, the trailer is jacked up and the wheel originally carried by axle 38 is removed because its supporting bearing has burned out or because its tire is flat. Next, frame 12 is positioned beneath leaf springs 16 and base portions 40 of brackets 14 are pivoted so that each crosspiece 50 is in engagement with leaf springs 16. With tabs 58 positioned against leaf springs 16, threaded fasteners 44 are extended through flanges 52 and locking portions 42 that have been positioned atop leaf springs 16. Securely tightening threaded fasteners 44 locks assembly 10 upon the suspension of a trailer. When the trailer is jacked back down, it may be used in a normal fashion with the ride experienced by the cargo carried by the trailer being smooth and undiminished. The entire installation process for spare wheel assembly 10 requires but a few minutes to complete and does not require a user to leave the trailer unattended for even a second.

While the invention has been described with a high degree of particularity, it will be appreciated by those skilled in the art that modifications may be made thereto. Therefore, it is to be understood that the present invention is not limited to the sole embodiment described above, but encompasses any and all embodiments within the scope of the following claims.

I claim:

1. A spare wheel assembly, comprising:
   a frame having opposed ends;
   a wheel hub being secured to one end of said frame;
   a pair of mounting brackets being adapted for attachment to leaf springs of a trailer and being pivotally secured to said frame, one of said mounting brackets being secured to the end of said frame to which said wheel hub is not secured and the other one of said mounting brackets being secured to said frame between said wheel hub and the other one of said mounting brackets; and,
   a wheel being secured to said wheel hub.

2. The spare wheel assembly according to claim 1 wherein said frame includes:
   a longitudinal member to which said pair of mounting brackets is pivotally secured; and,
   a transverse member being secured to, and extending at right angles from, said longitudinal member, said transverse member having a free end remote from said longitudinal member and carrying said wheel hub at said free end.

3. The spare wheel assembly according to claim 1 wherein each of said brackets includes:
   a base portion having a pair of upright legs joined at tops thereof by a crosspiece, said crosspiece projecting outwardly from both of said legs so as to define a pair of retaining flanges respectively located on opposite sides of said base portion;
   a locking portion being positioned in registry with said base portion; and,
   a pair of threaded fasteners passing through said retaining flanges and said locking portion for releasably and adjustably fastening said base portion and said locking portion together.

4. The spare wheel assembly in accordance with claim 3 wherein each of said base portions further includes a tab extending upright from said crosspiece thereof for engagement with the leaf springs of a trailer so as to align said spare wheel assembly with a longitudinal axis of a trailer.

5. A spare wheel assembly, comprising:
   a frame;
   a wheel hub being secured to said frame;
   a pair of mounting brackets being adapted for attachment to leaf springs of a trailer and being pivotally secured to said frame, each of said mounting brackets including:
      a base portion having a pair of upright legs joined at tops thereof by a crosspiece;
      a locking portion being positioned in registry with said crosspiece; and,
      a pair of threaded fasteners passing through said crosspiece and said locking portion for releasably and adjustably fastening said base portion and said locking portion together; and,
   a wheel being secured to said wheel hub.

6. The spare wheel assembly according to claim 5 wherein said frame includes:
   a longitudinal member to which said pair of mounting brackets is pivotally secured; and,
   a transverse member being secured to, and extending at right angles from, said longitudinal member, said transverse member having a free end remote from said longitudinal member and carrying said wheel hub at said free end.

7. The spare wheel assembly in accordance with claim 5 wherein each of said base portions further includes a tab extending upright from said crosspiece thereof for engagement with the leaf springs of a trailer so as to align said spare wheel assembly with a longitudinal axis of a trailer.

8. A spare wheel assembly, comprising:
a frame including:
- a longitudinal member having opposed ends; and,
- a transverse member being secured to, and extending at right angles from, one of said opposed ends of said longitudinal member, said transverse member having a free end remote from said longitudinal member;

a wheel hub being secured to said free end of said transverse member;

a pair of mounting brackets being adapted for attachment to leaf springs of a trailer and being pivotally secured to said frame, each of said mounting brackets including:

- a base portion having a pair of upright legs joined at tops thereof by a crosspiece;

- a locking portion being positioned in registry with said crosspiece; and,

- a pair of threaded fasteners securing said base portion to said locking portion; and, a wheel being secured to said wheel hub.

* * * * *